United States Patent
Herrmann et al.

(10) Patent No.: US 10,250,611 B2
(45) Date of Patent: Apr. 2, 2019

(54) AUTHENTICATING DRIVERS

(71) Applicant: Allstate Insurance Company, Northbrook, IL (US)

(72) Inventors: Alexander Herrmann, Chicago, IL (US); Connor Walsh, Lake Forest, IL (US); Pratheek M. Harish, Ontario (CA)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 15/458,735

(22) Filed: Mar. 14, 2017

(65) Prior Publication Data

US 2018/0270241 A1    Sep. 20, 2018

(51) Int. Cl.
H04L 29/06     (2006.01)
G05D 1/00      (2006.01)
H04W 24/00     (2009.01)
G06F 17/30     (2006.01)
G07C 5/00      (2006.01)
B62D 15/02     (2006.01)
G01S 19/13     (2010.01)

(52) U.S. Cl.
CPC .......... *H04L 63/102* (2013.01); *B62D 15/021* (2013.01); *G01S 19/13* (2013.01); *G06F 17/30241* (2013.01); *G07C 5/008* (2013.01)

(58) Field of Classification Search
CPC ..... H04L 63/102; H04L 29/06; G08G 1/0965; G08G 1/056; F01N 9/00; H04W 24/00; H04W 8/22; B60R 25/32; B60R 22/00; G01C 21/36; G01C 21/34; G06F 7/00; G05D 1/00
See application file for complete search history.

(56) References Cited

U.S. PATENT DOCUMENTS

| | | | |
|---|---|---|---|
| 9,373,203 B1* | 6/2016 | Fields | G07C 5/12 |
| 9,738,125 B1* | 8/2017 | Brickley | H04W 4/70 |
| 9,854,086 B1* | 12/2017 | McSchooler | H04M 1/72577 |
| 2008/0021640 A1* | 1/2008 | Pyo | G01C 21/3641 |
| | | | 701/533 |
| 2012/0316712 A1* | 12/2012 | Simonini | B60K 6/46 |
| | | | 701/22 |
| 2013/0281079 A1* | 10/2013 | Vidal | H04W 8/22 |
| | | | 455/418 |
| 2015/0091713 A1* | 4/2015 | Kohlenberg | B60R 25/32 |
| | | | 340/426.36 |
| 2015/0168174 A1* | 6/2015 | Abramson | G01C 21/3697 |
| | | | 701/408 |
| 2015/0260074 A1* | 9/2015 | Argolini | F01N 9/00 |
| | | | 701/102 |
| 2017/0018178 A1* | 1/2017 | Poechmueller | G08G 1/056 |
| 2017/0032673 A1* | 2/2017 | Scofield | G08G 1/0112 |

OTHER PUBLICATIONS

Apr. 9, 2019—(WO) International Search Report and Written Opinion—PCT/US18/022186.

* cited by examiner

*Primary Examiner* — Yuri Kan
(74) *Attorney, Agent, or Firm* — Banner & Witcoff, Ltd.

(57) ABSTRACT

One or more devices in a data analysis computing system may be configured to receive and analyze movement data and determine driving trips based on the received data. The driving trips may be used along with the movement data to authenticate drivers based on a determined driver profile.

19 Claims, 5 Drawing Sheets

AUTHENTICATING DRIVERS

TECHNICAL FIELD

Various aspects of the disclosure generally relate to systems and methods of collecting data from a computing device to determine driver authentication. Specifically, various aspects relate to systems and methods of collecting and analyzing global positioning (GPS) data and movement data to authenticate drivers.

BACKGROUND

The ability to collect and analyze data to determine who is driving a vehicle has many valuable applications, for example, relating to vehicle and driver insurance, vehicle financing, product safety and marketing, government and law enforcement, and various other applications in other industries. The goal of driver detection, or driver fingerprinting, is to determine whether a user recording a car trip with a computing device is a driver or a passenger of the vehicle. If driver profiles are known or have been determined for all potential drivers of a vehicle, then the solution becomes one of driver identification. If all potential drivers are known the solution becomes one of a forced task choice that determines which driver profile is the closest match in the database.

In contrast, solving the problem of driver authentication involves determining the driver from a pool of drivers that may be largely unknown. Solving such a problem is needed and would have many valuable applications. Further complications that need to be overcome in the context of driver authentication include making such determinations based on unsupervised, i.e. unlabeled data. Additionally, there is a need to determine driver authentication based on a method which is agnostic to road, traffic, and weather conditions. Finally, a need exists for a method and system to determine driver authentication based on collected real-time data. Such real-time data may be collected in non-uniform/varying road, traffic, and weather conditions.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, apparatuses, computer-implemented methods, and computer-readable media for receiving and analyzing GPS and movement data to identify driving patterns and drivers based on the data. In some cases, the movement data may correspond to acceleration data, speed data, or other movement data collected by various movement sensors in one or more mobile devices, such as smartphones, tablet computers, and on-board vehicle systems.

According to some aspects of the disclosure, data such as GPS data and movement data may be received and used to determine whether a user is a driver or passenger of a vehicle. A small amount of labeled trips may be used to generate a user driver profile, e.g. by sampling routine trips that have a high likelihood of the user driving or by asking the user to label a small amount of trips. Once this small subset of labeled trips is obtained, a driving pattern may be determined for the driver. The determined driving pattern may be used to generate a driving profile for the driver. In an embodiment, the generated driving profile from a new test trip may be compared to previously generated driver profiles and a stored background driver profile in order to authenticate the driver identity based on the comparison.

According to some aspects of the disclosure, driving patterns may be determined based on statistical analyses of the GPS and movement data. Trip attributes such as number of stopping points during a trip, number of turns, acceleration rate, deceleration rate, time of day etc. may be used to determine driving patterns. Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
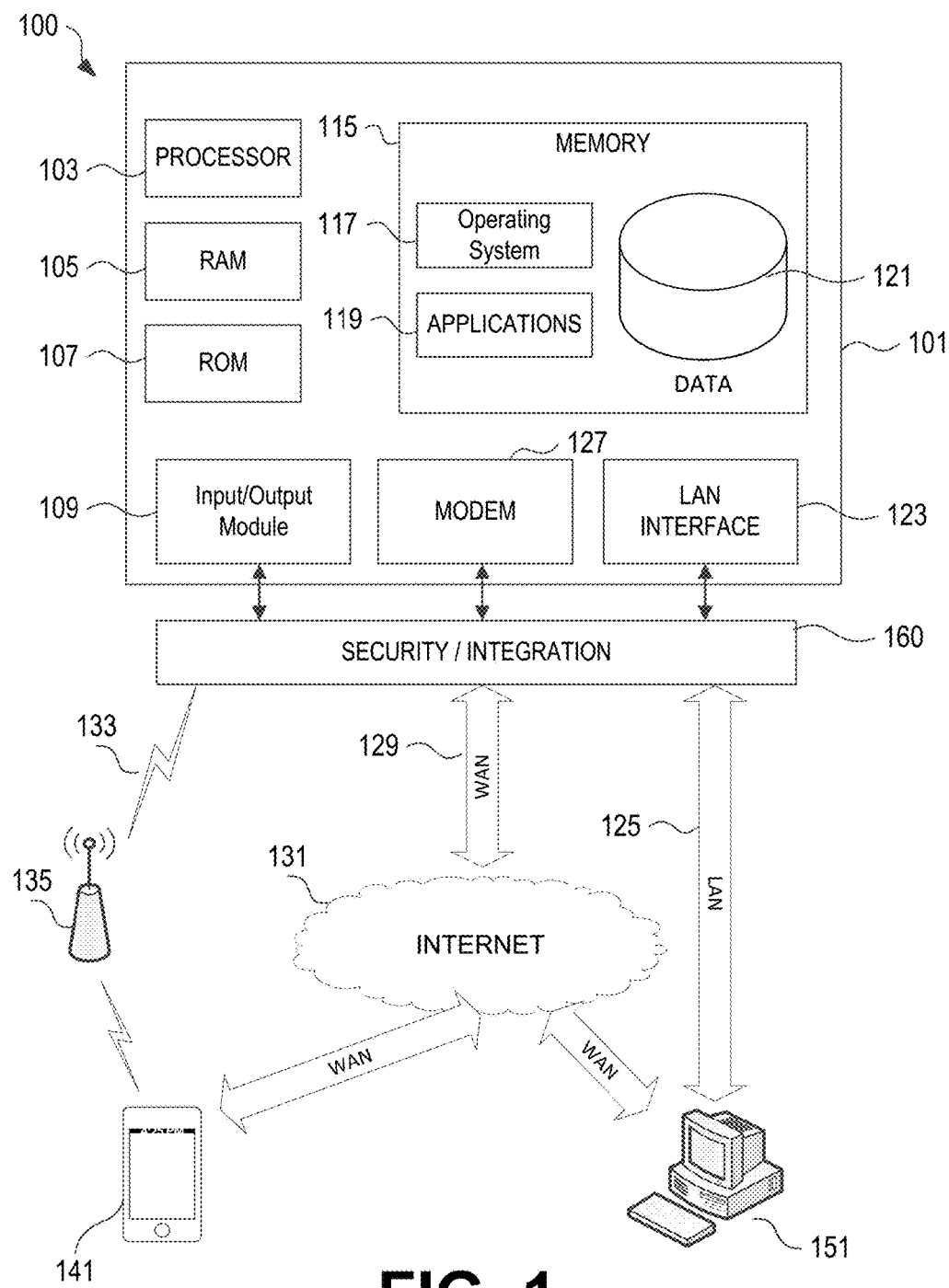
FIG. 1 illustrates a network environment and computer systems that may be used to implement aspects of the disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices, such as a mobile computing device or a driving data analysis server, configured as described herein for receiving and analyzing movement data from mobile device movement sensors, and identifying driving patterns and drivers associated with the movement data.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer readable instructions, data structures, program modules or other data. Certain devices/systems within a movement data/driving data analysis system may have minimum hardware requirements in order to support sufficient storage capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., an insurance provider server 101, a movement data/driving data analysis device 101, etc.), in order to store and/or execute a movement data analysis software application, receive and process sufficient amounts of movement data from various sensors at a determined data sampling rate, and analyze movement data to identify driving patterns and determine associated drivers, etc. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EE-PROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, to execute a movement data analysis software application that receives and stores data from mobile device movement sensors, analyzes the movement data, and determines driving patterns and associated drivers based on the movement data.

The computing device (e.g., a mobile computing device, a driving data analysis server, etc.) may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, on-board vehicle computing systems, and the like), and may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, portable customer computing devices, on-board vehicle computing systems, etc.) via one or more network devices 135 (e.g., base transceiver stations) in the wireless network 133.

Also illustrated in FIG. 1 is a security and integration layer 160, through which communications may be sent and managed between the device 101 (e.g., a user's mobile device, a driving data analysis system, etc.) and the remote devices (141 and 151) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a driving data analysis server operated by an insurance provider, financial institution, governmental entity, or other organization, may comprise a set of web application servers configured to use secure protocols and to insulate the server 101 from external devices 141 and 151. In some cases, the security and integration layer 160 may correspond to a set of dedicated hardware and/or software operating at the same physical location and under the control of same entities as driving data analysis server 101. For example, layer 160 may correspond to one or more dedicated web servers and network hardware in an organizational datacenter or in a cloud infrastructure supporting a cloud-based driving data analysis system. In other examples, the security and integration layer 160 may correspond to separate hardware and software components which may be operated at a separate physical location and/or by a separate entity.

As discussed below, the data transferred to and from various devices in the computing system 100 may include secure and sensitive data, such as movement data, driving pattern data, and/or driving behavior data associated with a driver or vehicle. Therefore, it may be desirable to protect transmissions of such data by using secure network protocols and encryption, and also to protect the integrity of the data when stored on in a database or other storage in a mobile device, driving data analysis server, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in a system 100. Data may be transmitted through the security and integration layer 160, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., movement data, location data, driving behavior data, etc.) between the various devices 101 in the system 100. Web services built to support system 100 may be cross-domain and/or cross-platform, and may be built for enterprise use. Such web services may be developed in accordance with various web service standards, such as the Web Service Interoperability (WS-I) guidelines. In some examples, a movement data and/or driving data web service may be implemented in the security and integration layer 160 using the Secure Sockets Layer (SSL) or Transport Layer Security (TLS) protocol to provide secure connections between servers 101 and various clients 141 and 151 (e.g., mobile devices, data analysis servers, etc.). SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a movement data database, a driving pattern database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of movement data and driving data collection and analysis systems, such as faster response times and less dependence on network conditions when transmitting/receiving movement data analysis software applications (or application updates), movement data, driving pattern data, etc.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119 may be used by the various computing devices 101 within a movement data and/or driving data analysis system 100 (e.g., movement data analysis software applications), including computer executable instructions for receiving and storing movement data from mobile device sensors, analyzing the movement data to identify driving patterns and drivers associated with the movement data, and performing other related functions as described herein.

Figure 2:
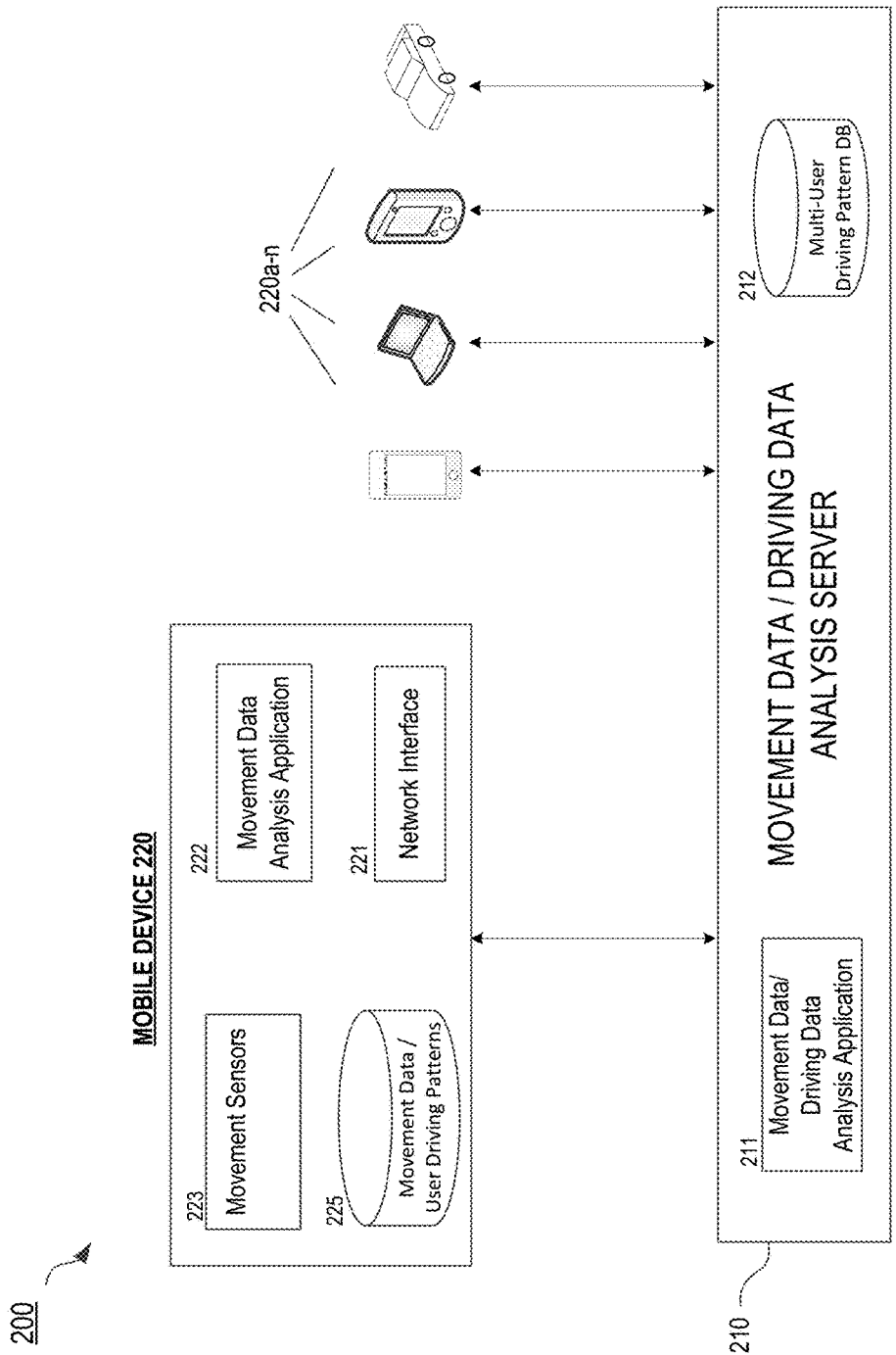
FIG. 2 is a diagram illustrating the components of an example movement data and driving data analysis system, according to one or more aspects of the disclosure.

FIG. 2 is a diagram of an illustrative movement data/driving data analysis system 200. In this example system diagram, a movement data/driving data analysis server 210 may communicate with a plurality of different mobile computing devices 220, which may include, for example, mobile user devices (e.g., smartphones, personal digital assistants, tablet and laptop computers, etc.), on-board vehicle systems, and any other mobile computing devices. Each component of a movement data/driving data analysis system 200 may include a computing device (or system) having some or all of the structural components described above for computing device 101. Additionally, although not shown in FIG. 2, any movement data/driving data analysis system 200 described herein may include various non-vehicle roadway infrastructure devices, such as toll booths, rail road crossings, traffic cameras, and road-side traffic monitoring devices. In various examples, the movement data/driving data analysis servers 210 and/or mobile computing devices 220 may be configured to communicate with such infrastructure devices, which may serve as additional data sources for movement data and/or driving data. For instance, vehicle speed, acceleration, and the like, may be obtained by road-side traffic monitoring devices and transmitted to one or more mobile computing devices 220 and/or movement data/driving data analysis servers 210.

The data analysis server 210 may be, for example, a computer server having some or all of the structural components described above for computing device 101. As described below in more detail, in some cases the data analysis server 210 may be configured to provide movement data analysis software applications to various mobile computing devices 220. The data analysis server 210 also may be configured to receive and analyze movement data (which may or may not correspond to driving data) from mobile computing devices 220, attempt to identify driving patterns based on the received movement data, and use driving patterns to identify drivers and other driving characteristics associated with the movement data. Therefore, in some embodiments, the server 210 may include one or more movement data and/or driving data analysis software applications 211, and one or more driving pattern databases 212. As described below in more detail, the server 210 may distribute a first software application 211 to mobile devices 220, for example, a movement data analysis application 211

(which may be stored as application 222 on the mobile device 220). The movement data analysis application 222 may operate on the mobile device 220 to analyze movement data and determine driving patterns within the movement data. A second software application 211 operating on the server 210, may be configured to receive and analyze the driving pattern data from the movement data analysis application 222 on the mobile device 220, and to identify a driver for the driving trip by determining and matching an observed driving pattern to previously-stored driving pattern in the driving pattern database 212.

In order to perform the functionality described above, and the additional functionality discussed in more detail below, the server 210 may include one or more processing units (e.g., single-core, dual-core, or quad-core processors, etc.) having a minimum sufficient bit size (e.g., 32-bit, 64-bit, 96-bit, 128-bit, etc.) and minimum required processor speeds (e.g., 500 MHz, 1 GHz, etc.), and sufficient volatile and nonvolatile memory (e.g., at least 256 MB of RAM, at least 5 GB of memory, etc.), in order to store movement data/driving data analysis applications (e.g., including various different versions, upgrades, etc.), establish communication sessions with and distribute applications to various mobile computing devices 220, and receive and analyze movement data/driving data from the mobile computing devices 220. Additionally, as described below, private and secure data may be transmitted between the data analysis server 210 and various mobile computing devices 220, such as private location data, movement data, driving behavior data, and personal driver/customer data, etc. Therefore, in some embodiments, server 210 may include various security and/or integration components (e.g., web servers, authentication servers) and/or various network components (e.g., firewalls, routers, gateways, load balancers, etc.). The server 210 also may provide and/or require communications over certain secure protocols or encryption techniques (e.g., FTP or SFTP, PGP, HTTP or HTTPS, SOAP, XML encryption, etc.), in order to protect the private or secure data transmitted between the server 210 and various mobile computing devices 220.

The movement data/driving data analysis system 200 in these examples may also include a plurality of mobile computing devices 220. As discussed below, in some embodiments, mobile computing devices 220 may receive and execute a movement data analysis software application 222 from the server 210 or other application provider (e.g., an application store or third-party application provider). As part of the execution of the movement data analysis software application 222, or implemented as separate functionality, mobile computing device 220 may receive and analyze movement data from movement sensors 223 of the mobile device 220, identify driving patterns based on the received movement data, and use driving patterns to identify drivers associated with the movement data. Accordingly, in some embodiments, a mobile computing device 220 may include one or more processing units having a minimum sufficient bit size (e.g., 32-bit, 64-bit, etc.) and minimum required processor speeds (e.g., 233 MHz, 500 MHz, etc.), and sufficient volatile and nonvolatile memory (e.g., at least 256 MB of RAM, at least 1 GB of memory, etc.), in order to store and execute one or more such movement data analysis software applications, and to establish communication sessions with a data analysis server 210 and/or various other devices (e.g., on-board vehicle systems, other mobile devices 220, etc.) to transmit or receive movement data, driving pattern data, etc. Additionally, mobile computing devices 220 may receive and transmit private or secure data, such as private location data, movement data, and driving behavior data, and personal driver/customer data, etc. Therefore, in some embodiments, mobile computing devices 220 may include various network components (e.g., firewalls, routers, gateways, load balancers, etc.), and may provide and/or require communications over certain secure protocols or encryption techniques (e.g., FTP or SFTP, PGP, HTTP or HTTPS, SOAP, XML encryption, etc.), in order to protect the private or secure data transmitted between the mobile device 220 and other devices.

Mobile device 220, which may be a smartphone, personal digital assistant, tablet computer, on-board vehicle system, etc., may include some or all of the elements described above with respect to the computing device 101. In this example, mobile device 220 includes a network interface component 221, which may include various network interface hardware (e.g., LAN interfaces, WAN modems, or wireless transceivers, etc.) and software components to enable mobile device 220 to communicate with one or more movement data/driving data analysis servers 210, other mobile devices 220, and various other external computing devices (e.g., application stores, third-party driving data servers, etc.). As shown in FIG. 2, a movement data analysis software application 222 may be stored in the memory of the mobile device 220. The movement data analysis software application 222 may be received via network interface 221 from server 210 or other application provider (e.g., an application store).

Mobile computing devices 220 may include one or more movement sensors 223 configured to detect, generate, and collect movement data when the device 220 is moved. Movement sensors 223 may include, for example, GPS sensors, accelerometers, speedometers, compasses, and gyroscopes. Additional movement sensors 223 may include certain sensors that might not be specifically designed to detect movement, but nonetheless may be used to detect movement by collecting and analyzing the sensor data over time, for example, cameras, proximity sensors, and various wireless network interfaces capable of detect access to different data networks, mobile networks, and other mobile devices (e.g., via Bluetooth). Different mobile devices 220 may include different sets of movement sensors 223. For instance, one smartphone may include only an accelerometer and a clock to collect and store device acceleration data and corresponding time data, while another smartphone or vehicle on-board computer may include an accelerometer, clock, speedometer, and compass (to collect speed and directional data), etc.

The memory of the mobile device 220 also may include one or more databases or other storage arrangements 225. Databases 225 may be configured to receive and store, for example, movement data collected by the movement sensors 223 of the mobile device 220, before that data is analyzed using the movement data analysis software application 222. In some cases, database 225 also may store the driving pattern data for one or more users of the mobile device 200. Driving pattern data, discussed in more detail below, may include one or more sets of movement data samples or calculations that may be used to identify a particular driver associated with observed driving data. Database 225 may store driving pattern data for the device owner and/or other devices users (e.g., family members, friends, and/or frequent users of the device 200). In some cases, multiple driving patterns may be stored for the same user. For instance, a driver may have different observable driving patterns when driving different cars (e.g., the family minivan versus the convertible), driving with different people (e.g., driving alone versus driving with family members), driving at different times/locations (e.g., driving to work versus on the weekend), driving during different seasons/conditions (e.g., summer versus winter driving), or driving in a caravan (e.g., leading or following other known drivers). In some examples, the driving data database 225 may exist within the application memory for the movement data analysis software application 222, and in other examples may be stored separately as persistent data within the device memory.

As shown in FIG. 2, in certain examples, a mobile device 220 may be an on-board vehicle system. In these examples, the on-board vehicle system 220 may correspond to a telematics device, vehicle computer, and/or on-board diagnostics systems. The on-board vehicle system 220 may include some or all of the elements described above with respect to the computing device 101, and may include similar (or the same) components to those in other mobile user devices 220 (e.g., smartphones, tablet computers, etc.). For on-board vehicle systems 220, movement sensors 223 may further include the various vehicle sensors, including hardware and/or software components configured to receive vehicle driving data collected by the various vehicle sensors. For example, vehicle sensors may detect and store data corresponding to the vehicle's speed, distances driven, rates of acceleration or braking, and specific instances of sudden acceleration, braking, turning, and swerving. Sensors also may detect and store data received from the vehicle's internal systems, such as headlight usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems. Additional vehicle sensors may detect and store data relating to the maintenance of the vehicle, such as the engine status, oil level, engine coolant temperature, odometer reading, the level of fuel in the fuel tank, the level of charge in the battery (e.g., for hybrid or electric cars), engine revolutions per minute (RPMs), and/or tire pressure. Certain vehicles also may include cameras and/or proximity sensors capable of recording conditions inside or outside of the vehicle, as well as sensors configured to collect data associated with a driver's movements or the condition of a driver, for example, sensors that monitor a driver's movements, such as the driver's eye position and/or head position, etc. Additional safety or guidance-assistance features may be included in some vehicles, detecting and storing data such as lane departures, activation of adaptive cruise control, blind spot alerts, etc.

In still other examples, the mobile device 200 may be a user device as described above (e.g., a smartphone, personal digital assistant, or tablet computer, etc.), and also may include a vehicle interface component to allow the mobile device to establish communication with an on-board vehicle system. For example, either the mobile device 220 or a vehicle may be implemented with hardware (e.g., an input port or docking station) and/or software (e.g., network interfaces, secure protocols and encryption, etc.), and may be designed and configured to establish communication (using a wired or wireless connection) between the mobile device 220 and an on-board vehicle system. For example, a smartphone or tablet computer 220, which is often carried by a user, may include an on-board vehicle system interface to detect and/or connect to an on-board vehicle system whenever the user is driving (and/or riding as a passenger) in a vehicle. After a mobile device 220 establishes communication with an on-board vehicle system, which may be a telematics device, on-board diagnostic system, vehicle navigation device, or other vehicle computer system, the mobile device 220 may receive vehicle sensor data collected by various vehicle sensors. Thus, non-vehicle based mobile devices 220 (e.g., smartphones or tablet computers) may use vehicle interfaces to receive some or all of the same vehicle sensor data and driving data that is accessible to on-board vehicle systems 220, discussed above.

The movement data collected by the movement sensors 223 of the mobile device 220, or received from another mobile device 220, may be stored in the memory of the mobile device 220 and/or transmitted to the server 210. This movement data may be analyzed by the mobile device 220 and/or by server 210 (e.g., using a movement data analysis software application) to determine when the movement data corresponds to a driving pattern, and using driving patterns to determine a driver and other characteristics of a driving trip. For instance, mobile device 220 or computing device 101 may be a standalone device capable of performing all of the functions described throughout this disclosure.

In an aspect of the disclosure, time series data recorded during a vehicle trip may contain several layers of information, including but not limited to information about the road, traffic, the vehicle, and the driver. Several frameworks may be employed for analysis of collected time series data. The first framework computes features at trip level and characterizes a time series by a set of statistical quantities which summarize the entire trip. The second framework breaks the time series up into small and partially overlapping window frames and computes features for each window frame separately.

In an embodiment, collected time series data may be pre-processed. For example, for testing purposes on labeled data (Collectr data), a minimum number of driver and non-driver trips may be selected. In an embodiment, a switch may be included to select test settings where negative samples are either restricted to be car passenger trips or, more generally, non-driver trips, i.e. trips with other modes of transport e.g. train, bus, plane, etc. Such non-driver trips may be included as part of the negative samples. In an embodiment, tails of the trip recorded after the trip has ended are cut off and a minimum-length filter for the resulting trips may be reapplied. Next, zero speed portions of trip time series may be excised. In addition, the trip time series may be resampled at constant intervals with a variety of interpolation and regression techniques, e.g. linear interpolation, spline interpolation or Savitzky-Golay filtering, before ingesting the trip into the pipeline.

In an embodiment of the disclosure, features for driver detection may be classified into two categories, routine-based and control-based. The routine-based category may make use of the fact that people are creatures of habit. For instance, 98 percent of the time a particular driver may take the same route every day to work at around the same time.

In an aspect of the disclosure, a user's driving pattern may be thought of as a fingerprint as each driver exhibits various driving tendencies. These tendencies may include but not limited to frequent braking, fast decelerations or accelerations, typical driving times (day versus night), distance of trips, number of turns on a driving trip, average speed, driving/not driving in various weather conditions, braking characteristics, phone handling patterns, wearing of seat belts, radio operation, and driving behavior. Additional driving characteristics that may be exhibited by a driver may include but is not limited to vehicle rpm, idling time, speed, vertical/horizontal acceleration, start and end time of trip.

Empirical investigation reveals that driver authentication in a supervised learning setting can often be carried out by looking at trip-level features that capture the routine of a user. For example, the starting and ending location of trips may provide sufficient information for a decision-making process.

Figure 3:
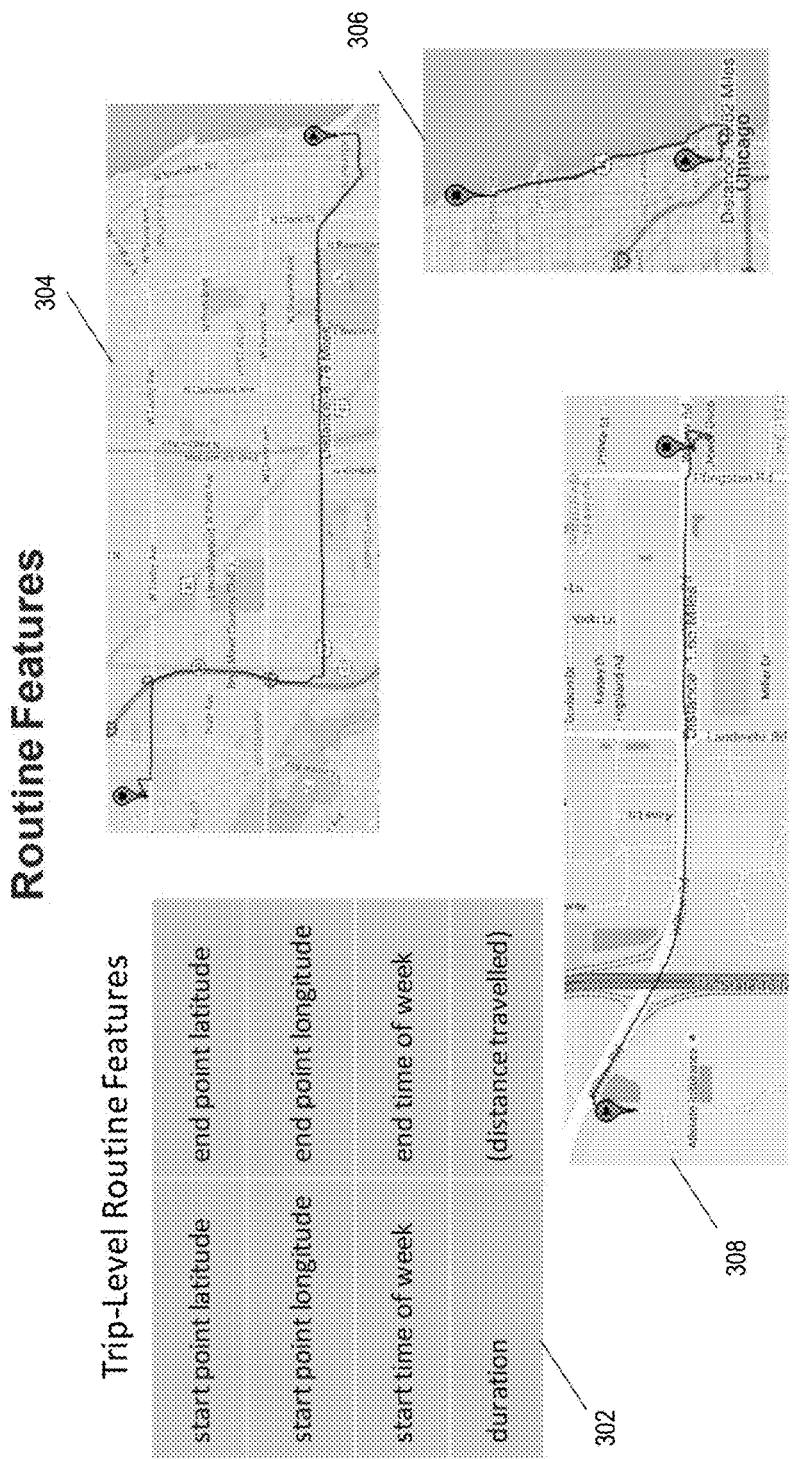
FIG. 3 is a diagram illustrating routine level features according to one or more aspects of the disclosure.

Routine features that are computed at trip level may include latitude and longitude of starting location, latitude and longitude of ending location, start time and end time normalized by day or week, duration of trip, etc. For instance, FIG. 3 illustrating routine level features according to one or more aspects of the disclosure. In FIG. 3, trip-level features are show in table 302. For each of trips 304, 306, and 308, trip-level features shown in table 302 may be captured and used to determine a driver of the associated vehicle.

In another aspect of the disclosure, a driver may have frequent identical driving trip events. For instance, a student "X" may leave his/her house every Monday through Friday at 8:15 am to arrive at school on time at 9:00 am. This student may take the exact same route to and from school each day. Each day the vehicle is driven to school, the number of right and left turns for each driving trip may be the same. Similarly, the mileage and driving time for each driving trip may also be very close within a reasonable tolerance. Such a consistent driving pattern may be associated with student "X" based on a number of such identical driving trips.

In an embodiment, a driving pattern may be generated by determining stopping points and the total number of turns with the received movement data. In some cases, a stopping point during a driving trip may correspond to a stop sign, stoplight, or other intersection stopping point, yielding or merging in traffic, stop-and-go traffic conditions, etc. Additionally, parking a vehicle for an extended period of time during a driving trip, or at the end of a driving trip, may be a stopping point. In an embodiment, driving patterns may be based on speed data, acceleration or braking data, or other movement data occurring during a driving trip.

The control-based category of features may consist of physical variables over which the user has direct influence in the short term. Control-based features may include but are not limited to gas pedal positions, brake pedal positions, steering wheel angle as well as various physical parameters closely related to and derived from quantities such as speed, acceleration, jerk, angular speed, angular acceleration, angular jerk and power per mass ratio, etc. In an embodiment, control-based features may be computed both at a trip level and at a window frame level.

Figure 4:
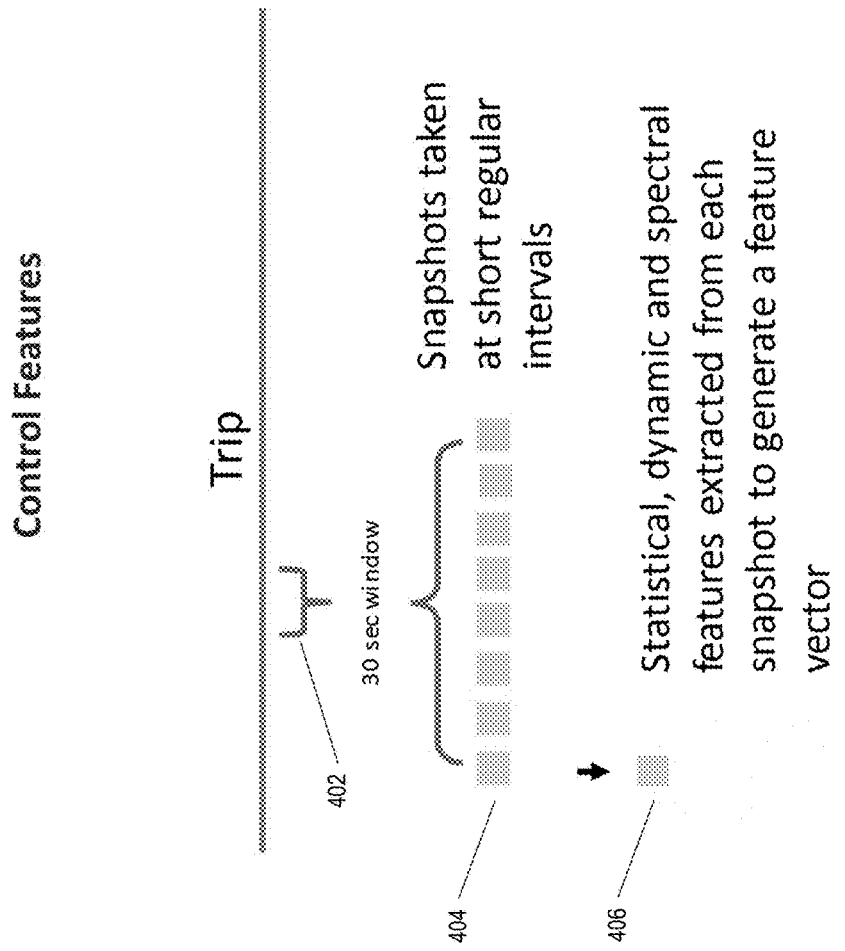
FIG. 4 is a diagram illustrating control level features according to one or more aspects of the disclosure.

FIG. 4 is a diagram illustrating control level features according to one or more aspects of the disclosure. As shown in FIG. 4 control level features are extracted from the GPS time series by looking at 30-50 second frames 402 which scan the time series. Stroboscopic snapshots 404 are taken at regular intervals and statistical, dynamic and spectral quantities are extracted (FIG. 4, 406) for each of the physical parameters in this table.

In an aspect of the disclosure, a computing device such as a mobile phone may collect sensor data regarding a driving trip. The sensor data may include velocity, acceleration. GPS data, time of day, duration of trip, distance traveled, etc.

In an aspect of the disclosure, different models for feature extraction may be applied to the routine based features and the control-based features. In an embodiment, for routine features a Gradient Boosting Machine (GBM) model may be used. Routine features may be extracted from the data and may yield exactly one feature vector sample per trip. In an embodiment, a feature vector for the GBM model may be represented by:

$$x_{gbm} = \begin{bmatrix} \text{start latitude} \\ \text{start longitude} \\ \text{end latitude} \\ \text{end longitude} \\ \text{start time} \\ \text{end time} \\ \text{duration} \end{bmatrix} = \begin{bmatrix} B_{start} \\ L_{start} \\ B_{end} \\ L_{end} \\ t_{start} \\ t_{end} \\ T \end{bmatrix}$$

In another embodiment, for routine feature classification, a tree-based method model such as a random forest (RF) model may be utilized. A tree-based model may be useful as latitude and longitude coordinates can be unwieldy for standard normalization techniques. As a result, methods that require these features to be normalized to zero mean and unit variance might suffer from the presence of GPS coordinates. In an embodiment, the output of decision trees is invariant under monotone feature transformations so that normalization and feature scaling may be unnecessary. Another advantage of decision trees, albeit somewhat diminished in a random forest setting, is that they are more resilient to the inclusion of irrelevant features. To reduce bias and variance of a decision tree, ensemble methods may be utilized.

In an aspect of the disclosure, for control-based features a Gaussian Mixture Model (GMM) may be used. In an embodiment, control-based features may be extracted by the GMM at a window frame level. In an embodiment, a time series of at least the following physical parameters may be determined: speed(s), acceleration (a), jerk (j), angular speed ($\omega$), angular acceleration ($\alpha$), angular jerk ($\chi$) and power per mass (ppm) ratio.

In an embodiment, from each of these physical parameters features may be extracted. These features may be inputted as a time series for each of these physical parameters. For instance, inputs may include a time series for velocity and a time series for acceleration. In an embodiment, examination of the different time series may be done by taking snapshots of portions of the time series. Each snapshot may include a small portion of the overall time series from which features may be extracted. In an embodiment, features that are extracted may be statistical, dynamic, and spectral in nature. For example statistical features may include the maximum, minimum, mean, standard deviation, skewness, kurtosis, quartiles, autocorrelation and entropy for each of the parameters.

The speed (s) and course (c) time series data may be directly obtained from a GPS signal. The course time series data may be used to compute the angular speed ($\omega$) time series as follows:

$$\omega_i = \frac{\pi}{180°} \begin{cases} \dfrac{c_{i+1} + (300° - c_i)}{t_{i+1} - t_i} & \text{if } c_{i+1} < 90° \text{ and } c_i > 270° \\ \dfrac{c_{i+1} - c_i - 360°}{t_{i+1} - t_i} & \text{if } c_{i+1} > 270° \text{ and } c_i < 90° \\ \dfrac{c_{i+1} + c_i}{t_{i+1} - t_i} & \text{otherwise} \end{cases}$$

Next, in an embodiment, speed and angular speed may be differentiated once to obtain the acceleration (a) and angular acceleration (α) time series, and twice to obtain the jerk (j) and angular jerk time (X) series.

$$a = \frac{ds}{dt} \quad j = \frac{da}{dt} = \frac{d^2s}{dt^2}$$

$$\alpha = \frac{d\omega}{dt} \quad \chi = \frac{d\alpha}{dt} = \frac{d^2\omega}{dt^2}$$

In an embodiment, the ppm ratio time series may be computed as the time derivative of the speed squared.

$$ppm = \frac{d}{dt}(s^2) \propto \frac{d}{dt}\left(\frac{E_{kin}}{m}\right)$$

The numerical differentiation may be performed with a two-sided four-point first-order finite difference approximation with $O(h^4)$ error in the intermediate points of a time series and with a one-sided three-point first-order finite difference formula with $O(h^3)$ error at the end points of a time series. For a time series with N points one may obtain:

$$f_i' \approx \begin{cases} \frac{2f_{i+3} - 9f_{i+2} + 18f_{i+1} - 11f_i}{6h} & \text{if } i = 0, 1 \\ \frac{2f_i - 9f_{i-1} + 18f_{i-2} - 11f_{i-3}}{6h} & \text{if } i = N-1, N-2 \\ \frac{-f_{i+2} + 8f_{i+1} - 8f_{i-1} + f_{i-2}}{12h} & \text{if } i \in [2, N-3] \end{cases}$$

Before differentiation is applied, the time series may be re-interpolated at constant intervals with a variety of interpolation and regression techniques, e.g. linear interpolation, spline interpolation or Savitzky-Golay filtering so as to allow the proper application of the finite difference formulas. The number of points in the time series may change as a result, especially if there are gaps in the time series.

The approximate frequency of the time series is 1 Hz as the data being utilized is GPS data. The window frame width may be selected to be between 30-50 seconds with an overlap of ca. one third of the window width between consecutive frames. In an embodiment, empirical cross-validation studies suggest that the optimal window frame length and sampling rate is ca. 3 s and 10 Hz, respectively. This may indicate that other sensors may be more optimal for use but also may also come with signal processing challenges with their use.

In an aspect of the disclosure, each window snapshot may yield a feature vector. The entries of the feature vector may consist of statistical, dynamic and spectral quantities for each of the aforementioned physical parameters. Statistical features in the current implementation may consist of the maximum, minimum, mean, standard deviation, skewness and kurtosis for each of the parameters from speed to ppm. Future implementations may also include quartiles, autocorrelation or entropy.

In another aspect of the disclosure, dynamic features may also be utilized. A dynamic feature of a physical parameter time series h(t) may be computed as follows:

$$\frac{\sum_{k=-K}^{K} k \cdot h(t+k)}{\sum_{k=-K}^{K} k^2}$$

In an embodiment, computation of either spectral or cepstral coefficients may also be utilized to assist in determining driver authentication. The proper application of these features may require that the sampling frequency be within a required range. In addition, a band pass filter may need to be applied to discard noise and retain frequencies of interest. In addition, the selection of the frame width and overlap needs to be carefully chosen and verified via cross-validation. Before a Discrete Fourier Transform (DFT) is applied to the time domain signal h(t) to convert it to its frequency domain signal H(ω), a windowing process may need to be performed. The application of a DFT assumes a periodic signal with a finite length and suffers if the points of a time series on the opposite ends of a frame do not meet at the same value. This generates artificial discontinuities in the time series signal which in turn produce artificial high-frequency components in the frequency domain. Energy from the frequencies of interest is moved into artificial pollutant frequencies resulting in a spectral leakage.

In order to mitigate this effect the time series h[n] for n∈{0, . . . , N–1} in the frame is multiplied point-wise by a Hamming window as follows:

$$\tilde{h}[n] = h[n] \cdot w[n] \text{ where } w[n] = 0.54 - 0.46 \cos\left(\frac{2\pi n}{N-1}\right)$$

The window function deemphasizes endpoints and brings their values closer together, thus diminishing the effect of discontinuities. The subsequent application of the DFT yields the frequency domain signal $$H[k] = DFT\{\tilde{h}[n]\} = \sum_{n=0}^{N-1} \tilde{h}[n] \cdot e^{-i\frac{2\pi kn}{N}} = \sum_{n=0}^{N-1} h[n] \cdot w[n] \cdot e^{-i\frac{2\pi kn}{N}}$$

with $k = 0, \ldots, \frac{N}{2}$

Here, $$\omega = \frac{2\pi k}{N}$$

is the angular frequency with $$k = \frac{N}{2}$$

corresponding to the folding or Nyquist frequency $0.5f_s$ with $f_s=1$ Hz. As already mentioned, the fundamental frequency $f_s$, also known as the sampling rate may need to be considerably higher for this approach to reach its full potential.

It should be noted that the H[k] lives in the domain of complex numbers which have both a magnitude and a phase. It is common practice to consider only the magnitude of this signal for feature extraction, i.e. $\hat{H}[k]=|H[k]|$. For each specific k, corresponding to a frequency of interest, $\hat{H}[k]$ represents one feature which is added to the existing feature vector extracted from a frame. Cepstral features are obtained by taking the log of the power spectrum and applying the Inverse Discrete Fourier Transform to the result. Only the real part the final quantity is considered.

$$c[n]=\text{Re}\{\text{IDFT}\{\log(\hat{H}[k])\}\}$$

This characterizes the spectral envelope. The application of the logarithm to $\hat{H}[k]$ converts the convolution of signals in the time domain, which becomes the product of these signals in the frequency domain, into the addition of these signals in the cepstral domain. Different cepstral coefficients characterize the contribution of different component signals in the final output signal. Using C[n] as features for different ranges of n can pick out individual component signals for machine learning purposes.

In an aspect of the disclosure, the Gaussian Mixture Model (GMM) in the context of a Universal Background Model (UBM) may be used in driver authentication. Each driver identity may be represented by a GMM probability density profile and each GMM may have a fixed number of hidden states which are automatically generated during training. The sensor source generating the time series data can be in a variety of different trip states. The trip states can be defined by the road type, traffic condition and driving maneuver. Each hidden state in the GMM should ideally correspond to one of these trip states, but can also represent trip states that may be harder to interpret. In order to prevent the differences between driver identity from being dominated by differences due to any other factors, comparisons between profiles are made within each hidden state, while taking into account the probability of being in the respective hidden state. Incoming feature vectors from individual trip window frames would first get evaluated as to which hidden state they correspond to. Then the profile differences within a hidden state may make the distinction between different drivers.

The general form of a Gaussian Mixture Model with K hidden states and n features is $$p(x|\phi,\mu,\Sigma) = \sum_{k=1}^{K} \phi_k \cdot \frac{1}{(2\pi)^{\frac{n}{2}}|\Sigma_k|^{\frac{1}{2}}} \cdot \exp\left(-\frac{(x-\mu_k)^T\sum_{k}^{-1}(x-\mu_k)}{2}\right) \quad (1)$$

with $\sum_k \phi_k = 1$.

In the GMM-UBM setting each driver receives a GMM profile based on a training set of driver trip samples. The number of hidden states K is set via cross-validation. The estimation of the parameters $\lambda=(\phi,\mu,\Sigma)$ is carried out with the Expectation-Maximization (EM) algorithm. Once these parameters are learned, incoming test samples $x_{test}$ can be evaluated with the model. The quantity $p(x_{test}|\phi,\mu,\Sigma)$ can be interpreted as the probability (more precisely probability density value) that $x_{test}$ was generated from the distribution p.

The application of the GMM-UBM requires the normalization of feature vectors to zero mean and unit variance to avoid singular matrices $\Sigma$ in equation (1). Each GMM $p_\lambda$ thus comes with its own training set and a corresponding $\mu_\lambda$ and $\sigma_\lambda$. These must be applied to any incoming test sample before evaluation. In addition, the dimension of feature vectors can become so large that the desired frame-by-frame feature extraction and evaluation may become impractical. For this reason, Principal Component Analysis (PCA) will be applied to reduce dimensionality while retaining 99% of the variance. Feature ranking algorithms based on decrease in gini-index in decision trees and mutual information filters are also employed in an offline fashion to pre-filter the feature list before feature extraction or PCA is applied.

In order to accelerate training and evaluation, the covariance matrices $\Sigma$ are restricted to be diagonal. The restriction to diagonal covariance matrices is done for several reasons. First, the density modeling of M-th order full covariance matrices can be achieved with higher order diagonal covariance matrices. Second, it simplifies the computation of the determinant and the inverse of $\Sigma$ in (1).

A test trip $\mathcal{T}$ may be broken up into overlapping window frames. Each frame may yield a feature vector whose entries are statistical, dynamic and spectral quantities of physical control parameters. Thus $\mathcal{T}=(x_1,\ldots,x_T)$ and the classification of the entire trip depends on the classification of its frames. The total probability value for a trip is taken to be the geometric mean of the probabilities for its individual frames.

$$p(\mathcal{T}|\lambda) = \left(\prod_{t=1}^{T} p(x_i|\lambda)\right)^{\frac{1}{T}}$$

It should be pointed out that the model is agnostic to the order in which the frames appear. Shuffling the frames does not affect the final result. In a supervised learning setting one could train one GMM on positive samples and a second GMM on negative ones, thus enabling a comparison between the two. This may be referred to as the GMM cohort model. In a semi-supervised setting the GMM-UBM should be used.

In an aspect of the disclosure, the Universal Background Model (UBM) may provide a contrasting profile to a given driver profile in order to enable a relative comparison for an incoming test sample. Evaluating a feature vector from an incoming test sample by computing its probability density value under the pertinent driver model provides an absolute number which by itself does not give us sufficient information to classify the test sample. In an embodiment, the UBM may generate a probability profile for an average background driver and enable computation of a probability density value $p(\mathcal{T}|\lambda_{UBM})$ for a trip. In an embodiment, a driver and background profile may be compared. If $p(\mathcal{T}_{test}|\lambda_{driver}) > p(\mathcal{T}_{test}|\lambda_{UBM})$, the trip may be classified as a driver trip, otherwise it is classified as a non-driver trip. Because the probability density values are very small, the log values of the probabilities may need to be compared.

In an embodiment, the UBM may enable determination of driver authentication in a semi-supervised setting, i.e. the GMM-UBM sees only positive labels and is agnostic to negative ones. In an aspect of the disclosure, the UBM may be built using a fixed UBM, a dynamic UBM, and an adaptive UBM.

In an aspect of the disclosure, a fixed UBM may involve training a single GMM on a large set of data comprising trips from many different drivers. This fixed UBM may be evaluated quickly, but may suffer from its static composition. In an embodiment the composition of the UBM may be changed and adapted to individual drivers. In an embodiment, to achieve this fit, the fixed UBM may have to be retrained.

In another embodiment, a dynamic UBM may enable determination of driver authentication in a semi-supervised setting. The dynamic UBM may be created by taking the GMM basis model $p(x|\lambda_{d_i})$ for each driver $d_i$ and expressing the final UBM as a linear combination of these functions.

$$p(x|\lambda_{UBM}) = \sum_{i=1}^{B} \alpha_i \cdot p(x|\lambda_{d_i}) \text{ where } \sum_{i=1}^{B} \alpha_i = 1$$

In an embodiment, an advantage of the dynamic UBM is that the coefficients $\alpha_i$ can be regarded as additional parameters that can be fitted to known negative samples in the training set for a driver. Given this additional knowledge about a certain driver, the coefficients to the driver in question may be adjusted in order to better represent these negative samples and thus achieve higher performance. In an embodiment, the dynamic UBM may be more malleable than the fixed UBM and may be easily adjusted by shuffling its basis functions. For example, the GMM for the driver in question should not be used in the contrasting UBM but is different from driver to driver. The dynamic setting may allow for selectively excluding this GMM as a basis function by setting its coefficient to zero. The default setting is $$a_i = \frac{1}{B},$$

where B is me total number of basis models excluding the driver in question. If data with negative labels is available, the performance of these basis functions can be ranked according to how well they represent the negative samples. In an embodiment, the top ranked models may be taken as the basis functions and set the coefficients of all other models to zero.

In another aspect of the disclosure, an adaptive UBM may enable determination of driver authentication in a semi-supervised setting. In an embodiment, the adaptive UBM may be a fixed UBM trained on all available data. In this setting the UBM is not built from driver GMM's but vice versa. In an embodiment, the fixed UBM built on the entire data set may act as a prior for the creation of a driver GMM. To derive the driver GMM from the fixed UBM, positive training samples for the driver in question may be used to update the well-trained parameters of the fixed UBM via adaptation.

In an embodiment, suppose that positively labelled driver data is available yielding a set of feature vectors $\chi = \{x_1, \ldots, x_T\}$. Suppose further that $\lambda_{UBM} = (\phi_k, \mu_k, \Sigma_k)$ with $k=1 \ldots K$ are learned. Then $\forall k \in \{1, \ldots, K\}$, $\lambda_{driver} = (\hat{\phi}_k, \hat{\mu}_k, \hat{\Sigma}_k)$ can be computed as follows:

$$\hat{\phi}_k = \gamma \left( \frac{\alpha_k^\phi n_k}{T} + (1 - \alpha_k^\phi) \phi_k \right) \quad (2)$$

$$\hat{\mu}_k = \alpha_k^\mu E_k(x) + (1 - \alpha_k^\mu) \mu_k \quad (3)$$

$$\hat{\Sigma}_k = \alpha_k^\sigma E_k(x^2) + (1 - \alpha_k^\sigma)\left(\sum_k + \mu_k \mu_k'\right) - \hat{\mu}_k \hat{\mu}_k' \quad (4)$$

where $$n_k = \sum_{t=1}^{T} Pr(k|x_t), E_k(x) = \frac{1}{n_k} \sum_{t=1}^{T} x_t Pr(k|x_t), \quad (5)$$

$$E_k(x^2) = \frac{1}{n_k} \sum_{t=1}^{T} x_t^2 Pr(k|x_t)$$

and $$Pr(k|x_t) = \frac{w_k p_k(x_t)}{\sum_{i=1}^{K} w_i p_i(x_t)} \quad (6)$$

The adaptation coefficients $\{a_k^\phi, a_k^\mu, a_k^\sigma\}$ regulate the contribution between the old and new mixture parameters. All parameters will be constrained to depend on a single parameter $\rho$, called the relevance factor, in the following fashion $$\alpha_k^\phi = \alpha_k^\mu = \alpha_k^\sigma = \frac{n_k}{n_k + \rho} \quad (7)$$

In an embodiment, the relevance factor may be set to $\rho=16$. The above recipe for updating the UBM coefficients may be obtained as a result of solving a maximum a posteriori (MAP) estimation problem for a GMM with $p(x|\lambda_{UBM})$ acting as the prior.

In an embodiment, use of an adaptive UBM may have advantages that include retaining a semi-supervised learning setting. In addition, the adaptive UBM may allow for a faster scoring technique when compared to other UBM designs.

In another aspect of the disclosure, routine trips which are well represented in the training set may be processed with the routine feature model. Unusual trips such as road trips or business trips may be passed to the control feature model. In an embodiment, an anomaly detection framework may be generated and used to determine whether a trip is well represented in the training set. Such a framework may determine whether to use the routine feature model or the control feature model.

In an embodiment, an anomaly detection framework may include using points of interest clustering. Incoming trips may be classified as anomalies if there is a very high likelihood that the endpoints of the incoming trip do not belong to any of the known Point Of Interest (POI) clusters. If a trip is an anomaly, preference may be given to the control-based GMM model. A two-dimensional Gaussian probability distribution may be fitted to each POI cluster. In an embodiment, a two-dimensional distribution with a diagonal covariance matrix with identical entries may be utilized.

A maximum log-likelihood estimation can be performed to derive the optimal fit. Given a POI cluster $c = \{(x^{(i)})\}_{i=1}^{m} = \{(x_{lat}^{(i)}, x_{long}^{(i)})\}_{i=1}^{m}$ of latitude and longitude coordinates, the MLE gives us $$l(\mu, \Sigma) = l(\mu, \lambda) = \log \prod_{i=1}^{m} p(x^{(i)}; \mu, \lambda) = \sum_{i=1}^{m} \log p(x^{(i)}; \mu, \lambda)$$

where $$p(x^{(i)}; \mu, \lambda) = \frac{1}{2\pi} \frac{1}{\lambda} \exp\left(-\frac{(x_{lat}^{(i)} - \mu_{lat})^2 + (x_{long}^{(i)} - \mu_{long})^2}{2\lambda}\right)$$

-continued $$\text{and } \Sigma = \begin{pmatrix} \lambda & 0 \\ 0 & \lambda \end{pmatrix}$$

Setting the derivatives w.r.t µ and λ to zero and solving for µ and λ yields $$\mu = \frac{1}{m}\sum_{i=1}^{m} x^{(i)}$$

$$\lambda = \frac{1}{m}\sum_{i=1}^{m} \frac{\|x^{(i)} - \mu\|^2}{2}$$

This allows the computation of a radius around the cluster mean. Samples falling within this radius have a certain probability of belonging to the respective cluster. Using this distribution, a simple integration shows that a sample belonging to a cluster with probability p must be within a radius $$R = \left(2\lambda \log\left(\frac{1}{1-p}\right)\right)^{\frac{1}{2}}.$$

For p=0.99, R=(2λ log 100)$^{1/2}$. If $\|x-\mu\|^2$>R, a trip is an anomaly.

In another embodiment, an anomaly detection framework may include using confidence scores. Tree-based methods may assign probability scores for positive and negative samples. GMM methods assign probability density scores. These scores can be used to compute confidence values.

In yet another aspect of the disclosure, incoming test samples may first be passed through a POI or other anomaly detection module and redirected to the GMM-UBM only in case of an anomaly. In the absence of an anomaly the test sample may be directed to the GBM. If the confidence score for the GBM verdict is above a certain threshold, the GBM result is the final output. Otherwise, the GMM result is computed and returned. It may be advantageous to develop a framework where the confidence scores of GBM and GMM can be properly compared so that one can compare the confidence values and rank the results accordingly.

In another aspect of the disclosure, other sensors such as an accelerometer and/or gyroscope may be used in place of the GPS signal. The accelerometer and/or gyroscope sensor may be included in a mobile device. The accelerometer and/or gyroscope sensors may use a sampling frequency in the range of 10-100 Hz. This granularity may allow for the capture of additional information which may be absent in 1 Hz GPS signals. In an embodiment, use of the accelerometer and/or gyroscope sensors may result in additional filtering to reduce signal noise. In addition, mobile device phone and car coordinate systems should ideally be completely aligned. Full alignment may be possible if gyroscope and gravity sensors are utilized. Partial alignment of z-axis may be achieved with gravity sensors only and may result in a sufficiently useful signal source for the purposes of driver detection. Finally, shock absorption in cushioned enclosures e.g. pocket or handbag, may dampen the signal and thus introduce additional distortions. Compensating for these distortions is extremely challenging, although not impossible in principle.

Figure 5:
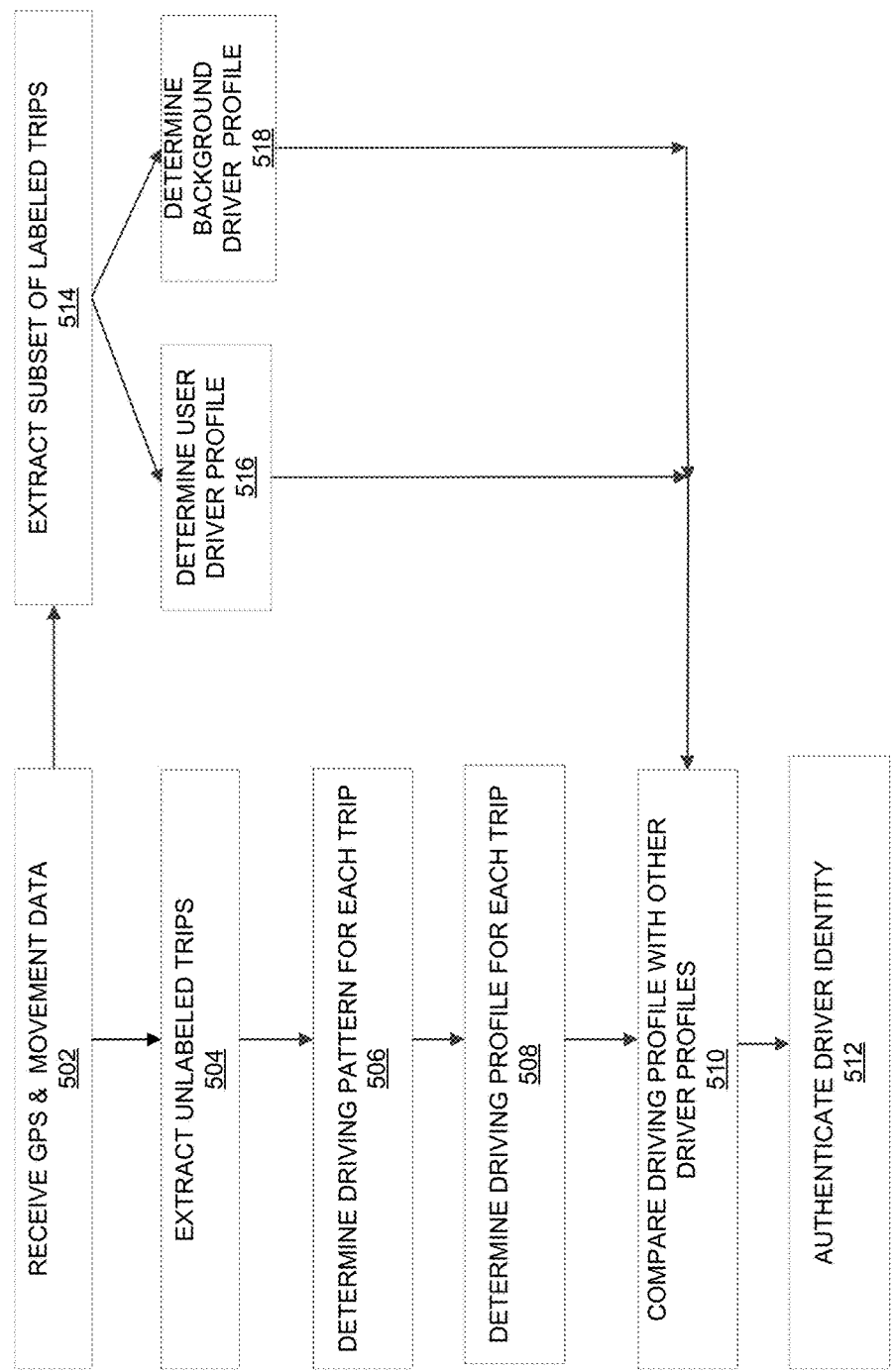
FIG. 5 is a flow diagram illustrating an example process of determining a driver based on GPS and movement data according to one or more aspects of the disclosure.

FIG. 5 illustrates an example process of determining a driver based on GPS and movement data according to one or more aspects of the disclosure. In FIG. 5, at step 502 data such as GPS data and movement data may be received. In step 504, unlabeled trip data may be extracted from the received GPS data and movement data. In step 514, labeled trip data may be extracted. In an aspect of the disclosure, a user driver profile may be determined based on the labeled trip data in step 516. In another aspect of the disclosure, a background driver profile may be determined based on a least in part the extracted labeled trip data in step 518.

In an aspect of the disclosure, a driving pattern for each trip may be determined in step 506. In an embodiment, driving data analysis server 210 (e.g., an insurance provider server 210 or other organizational server 210) may store the determined driving pattern and/or additional driving data. In some cases, a server 210 may receive determined driving patterns and driving data from a plurality of different mobile devices 220.

In step 508, a driving profile may be determined based on the determined driving pattern. In step 510, the driving profile may be compared to other driving profiles and to a generated background driver profile. In an embodiment, the background driver profile may be generated based on all known driving profiles. The background driver profile may represent an average of all known driving profiles. In step 512, the identity of the driver may be authenticated.

The driving data collected, when associated with the corresponding driver and/or vehicle data may have many different applications and may be provided to different entities. For example, the data may be used for vehicle or driver insurance or financing (e.g., driving data indicating safe or unsafe driving), law enforcement (e.g., driving data indicating moving violations), and product retail or marketing entities (e.g., driving data indicating a driver's driving behaviors and habits, such as radio stations and ads listened to, routes driven and stops made, etc.).

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. A device, comprising:
a processor; and
memory storing computer-executable instructions that, when executed by the processor, cause the device to:
receive global positioning system (GPS) data indicating location data of the device collected during a driving trip in a vehicle;
analyze the received GPS data to determine one or more stopping points during the driving trip, wherein the one or more stopping points correspond to one or more locations at which the vehicle stopped during the driving trip;
receive vehicle sensor data related to the vehicle and collected during the driving trip;
analyze the received vehicle sensor data to determine a total number of turns during the driving trip; and
determine a driving pattern for the driving trip, based at least in part on the determined one or more stopping points and the determined total number of turns.

2. The device of claim 1, further comprising:
determine a driving profile for the driving trip, based on the determined driving pattern;

compare the determined driving profile to previously determined driver profiles and a background driver profile;

determine an identity of a driver of the driving trip, based on the comparison to the previously determined driver profiles and the background driver profile; and display data corresponding to the determined identity of the driver.

3. The device of claim 1, wherein the device is one of a smartphone, tablet computer, or vehicle-based computer system.

4. A method, comprising:

receiving, at a movement data analysis computing device, global positioning (GPS) data collected during a driving trip in a vehicle;

analyzing, by the movement data analysis computing device, the received GPS data to determine one or more stopping points during the driving trip, wherein the one or more stopping points correspond to one or more locations at which the vehicle stopped during the driving trip;

receiving, at the movement data analysis computing device, vehicle sensor data collected during the driving trip;

analyzing, by the movement data analysis computing device, the received vehicle sensor data to determine a total number of turns during the driving trip;

determining, by the movement data analysis computing device, a driving pattern for the driving trip, based at least in part on the determined one or more stopping points and the determined total number of turns;

determining, by the movement data analysis computing device, a driving profile for the driving trip based on the determined driving pattern; and displaying, by the movement data analysis computing device, data corresponding to the determined driving pattern.

5. The method of claim 4, further comprising:

comparing the determined driving profile to previously determined driver profiles and a background driver profile;

determining an identity of a driver of the driving trip, based on the comparison to the previously determined driver profiles and the background driver profile; and displaying data corresponding to the determined identity of the driver.

6. A method, comprising:

receiving, at a movement data analysis computing device, first global positioning system (GPS) data collected during one or more first driving trips;

receiving, at the movement data analysis computing device and from at least one vehicle sensor of a vehicle, first vehicle sensor data collected during the one or more first driving trips;

receiving, from a user, an input labeling the one or more first driving trips as driving trips of the user;

generating, based on the labeled driving trips, a user driver profile for the user;

storing, in a memory, the user driver profile, wherein the memory stores a plurality of driver profiles;

receiving, at the movement data analysis computing device, second GPS data and second vehicle sensor data collected during a second driving trip;

determining, by the movement data analysis computing device and based on the second GPS data and the second vehicle sensor data associated with the second driving trip, a driving pattern;

determining, by the movement data analysis computing device and based on the determined driving pattern for the second driving trip, a driving profile;

comparing the determined driving profile for the second driving trip with the stored plurality of driver profiles; and authenticating, based on the comparison, driver identity.

7. The method of claim 6 further comprising, displaying, by the movement data analysis computing device, data corresponding to the determined driving pattern for the second driving trip.

8. The method of claim 6, further comprising:

wherein comparing the determined driving profile further comprises comparing the determined driving profile for the second driving trip to a background driver profile;

wherein authenticating the driver identity comprises determining an identity of a driver for the second driving trip, based on the comparison to the stored plurality of driver profiles and the comparison to the background driver profile; and displaying data corresponding to the authenticated driver.

9. The method of claim 6, further comprising:

generating a background driver profile based at least in part on the labeled driving trips.

10. The method of claim 9, further comprising:

comparing the determined driving profile to the background driver profile;

wherein the authenticating the driver identity comprises determining an identity of a driver for the second driving trip, based on the comparison to stored plurality of driver profiles and the comparison to the background driver profile; and displaying data corresponding to the authenticated driver.

11. The method of claim 6, further comprising:

determining stopping points within the second GP data;

determining a total number of turns within the second vehicle sensor data; and determining the driving pattern based on at least the determined stopping points and the determined total number of turns.

12. The method of claim 11, further comprising determining, within the second GPS data, a starting point latitude and an end point latitude of the second driving trip, wherein the end point latitude corresponds to a stopping point.

13. The method of claim 6, further comprising determining a start time and an end time of day within at least one of the second GPS data and the second vehicle sensor data.

14. The method of claim 6, further comprising determining distance traveled within at least one of the second GPS data and the second vehicle sensor data.

15. The method of claim 6, wherein determining the driving pattern further comprises:

determining steering wheel angle positions within the second vehicle sensor data; and determining the driving pattern based on at least the determined steering wheel angle positions.

16. The method of claim 6, wherein determining the driving pattern further comprises:

determining brake pedal positions within the second vehicle sensor data; and determining the driving pattern based on at least the determined brake pedal positions.

17. The method of claim 6, wherein determining the driving pattern further comprises:

determining gas pedal positions within the second vehicle sensor data; and determining the driving pattern based on at least the determined gas pedal positions.

18. The device of claim 1, where determining the one or more stopping points comprises:
determining, within the received GPS data, a starting point latitude and an end point latitude of the driving trip, wherein the end point latitude corresponds to a stopping point.

19. The method of claim 4, where determining the one or more stopping points comprises:
determining, within the received GPS data, a starting point latitude and an end point latitude of the driving trip, wherein the end point latitude corresponds to a stopping point.

* * * * *